United States Patent [19]
Worrell et al.

[11] Patent Number: 5,896,661
[45] Date of Patent: Apr. 27, 1999

[54] METHOD OF MAKING A STEERING HAND WHEEL

[75] Inventors: Barry Christian Worrell, Centerville; James Kent Conlee, Dayton; Brian Thomas Finnigan, Lewisburg, all of Ohio

[73] Assignee: General Motors Corporation, Detroit, Mich.

[21] Appl. No.: 09/037,344

[22] Filed: Mar. 10, 1998

[51] Int. Cl.$^6$ .................................................. B21D 53/26
[52] U.S. Cl. ............................. 29/894.1; 29/417; 74/552
[58] Field of Search ................... 29/894.1, 417; 74/552

[56] References Cited

U.S. PATENT DOCUMENTS

| | | | |
|---|---|---|---|
| 1,540,292 | 6/1925 | Sheller | 74/552 |
| 1,839,025 | 12/1931 | Geyer . | |
| 3,714,844 | 2/1973 | Tsuda | 74/552 |
| 4,627,307 | 12/1986 | Yamazawa et al. | 74/552 |
| 4,648,164 | 3/1987 | Hyodo et al. | 29/159 |
| 4,709,944 | 12/1987 | Hongo et al. | 280/777 |
| 4,875,387 | 10/1989 | Henigue | 74/552 |
| 5,291,800 | 3/1994 | Patzelt et al. | 74/552 |
| 5,356,178 | 10/1994 | Numata | 280/777 |
| 5,499,801 | 3/1996 | Nakazawa | 269/48.1 |
| 5,518,157 | 5/1996 | Evels et al. | 224/309 |

*Primary Examiner*—P. W. Echols
*Attorney, Agent, or Firm*—Saul Schwartz; Dean L. Ellis

[57] ABSTRACT

A method of making a steering hand wheel for a motor vehicle having a metal spider, a molded plastic rim, and a plurality of molded plastic spokes integral with the rim and mechanically interlocked with the spider. The method according to this invention includes the steps of extruding a billet having a cross sectional shape matching the profile of the spider, forming the spider by cutting off a flat section of the extruded billet from an end thereof, and insert molding a plastic rim and a plurality of integral plastic spokes around the spider. Each of the plastic spokes has an inboard end molded around a corresponding one of a plurality of spoke bases on the spider with a plurality of integral plastic pins captured in respective ones of a plurality of perforations in the spoke bases to mechanically interlock the spider and the molded plastic spokes.

3 Claims, 2 Drawing Sheets

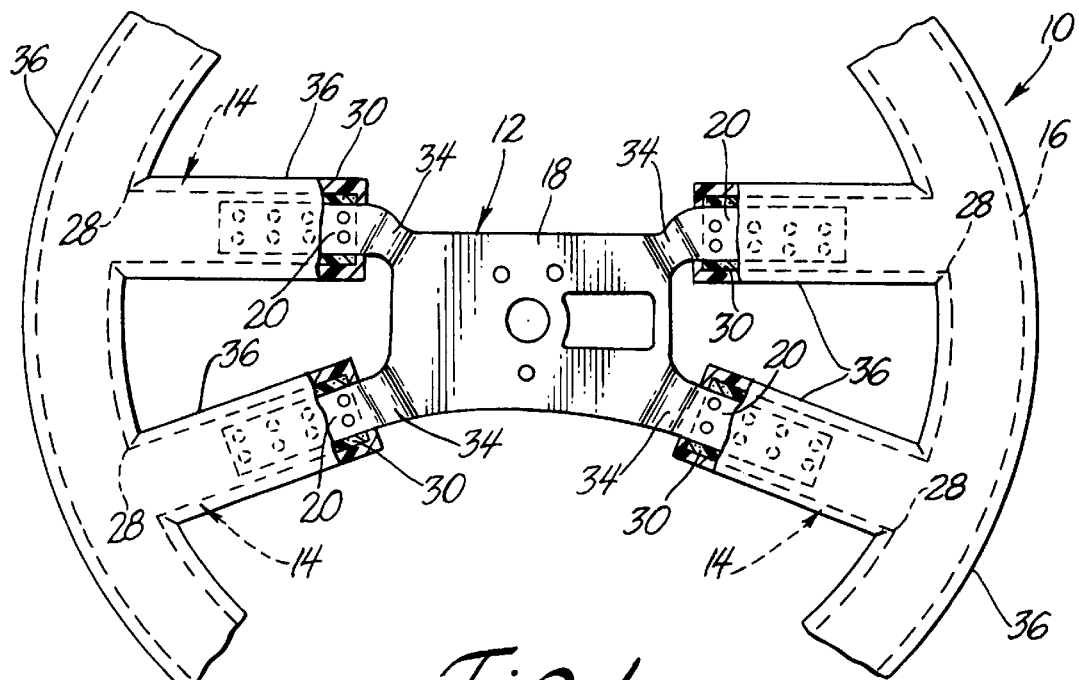
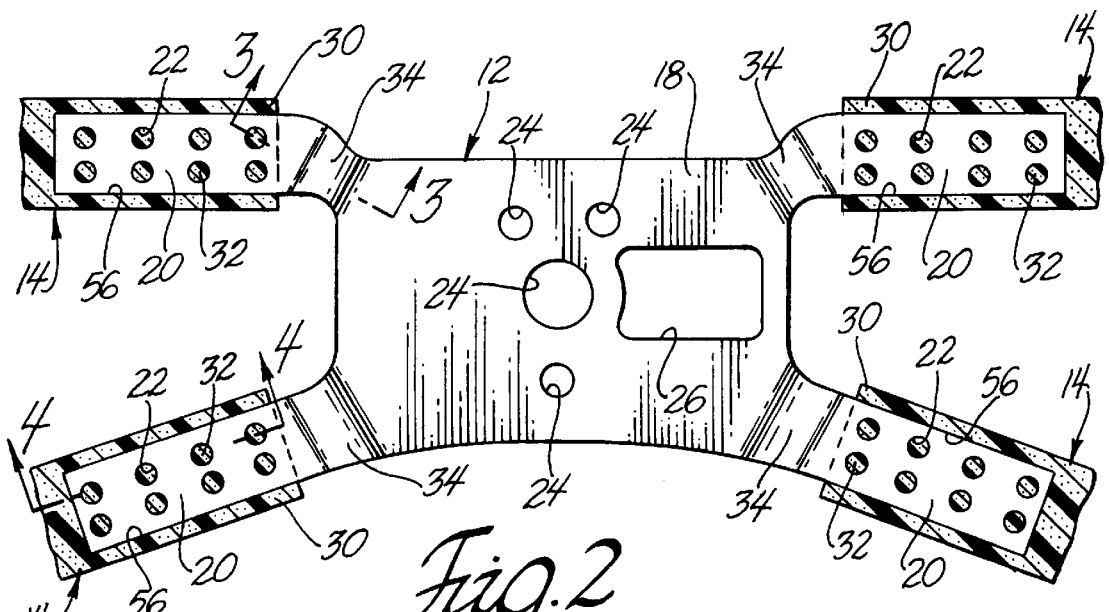
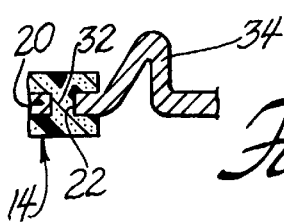
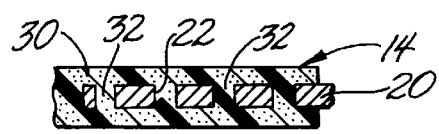

METHOD OF MAKING A STEERING HAND WHEEL

TECHNICAL FIELD

This invention relates to a method of making a steering hand wheel for a motor vehicle.

BACKGROUND OF THE INVENTION

Most motor vehicles are manually steered by an operator through application of steering effort to a steering hand wheel rigidly attached to the top of a steering shaft rotatably supported on a steering column of the motor vehicle. The steering hand wheel usually has a rim where the wheel is gripped by the operator, a metal spider where the wheel is attached to the steering shaft, and a plurality of spokes between the rim and the spider. In many applications, a urethane foam cover is molded over the rim, the spokes, and the spider. Typically, the rim is a metal rod shaped into a ring, the spider is made by a die casting process or by metal stamping, and the spokes are welded or clamped to the spider or encapsulated by portions of the spider die cast directly around the spokes. In some prior steering hand wheels, the spokes and/or the spider are shaped to absorb energy by deforming plastically upon impact and converting into work a fraction of the kinetic energy of the impact. In other proposed steering hand wheels, reinforced plastic spokes and a reinforced plastic rim are rigidly connected by various attachment techniques to a die cast or stamped metal spider. A method according to this invention of making a steering hand wheel for a motor vehicle is a novel alternative to the methods referred to above.

SUMMARY OF THE INVENTION

This invention is a new and improved method of making a steering hand wheel for a motor vehicle having a spider, a molded plastic rim, and a plurality of molded plastic spokes integral with the rim and mechanically interlocked with the spider. The method according to this invention of making a steering hand wheel includes the steps of extruding a billet having a cross sectional shape matching the profile of the spider, forming the spider by cutting off a section of the extruded billet from an end thereof perpendicular to a longitudinal centerline of the billet, and insert molding a plastic rim and a plurality of integral plastic spokes around the spider. Each of the spokes has an inboard end molded around a corresponding one of a plurality of spoke bases on the spider with a plurality of integral plastic pins captured in respective ones of a plurality of perforations in the spoke bases to mechanically interlock the spider and the molded plastic spokes. A modified embodiment of the method according to this invention of making a steering hand wheel includes an additional step of deforming the spider to define a plurality of lobes between a platform portion of the spider and the perforations in respective ones of the spoke bases which lobes absorb energy by plastic deformation in response to an impact on the steering hand wheel. Another modified embodiment of the method according to this invention of making a steering hand wheel includes an additional step of molding a urethane foam cover over the plastic rim, the plastic spokes, and the spider.

BRIEF DESCRIPTION OF THE DRAWINGS

FIG. 1 is fragmentary plan view of a steering hand wheel made by a method according to this invention;

FIG. 2 is an enlarged view of a spider of the steering hand wheel illustrating a step in the method according to this invention;

FIG. 3 is a sectional view taken generally along the plane indicated by lines 3—3 in FIG. 2;

FIG. 4 is a sectional view taken generally along the plane indicated by lines 4—4 in FIG. 2;

DESCRIPTION OF THE PREFERRED EMBODIMENT

Figure 5:
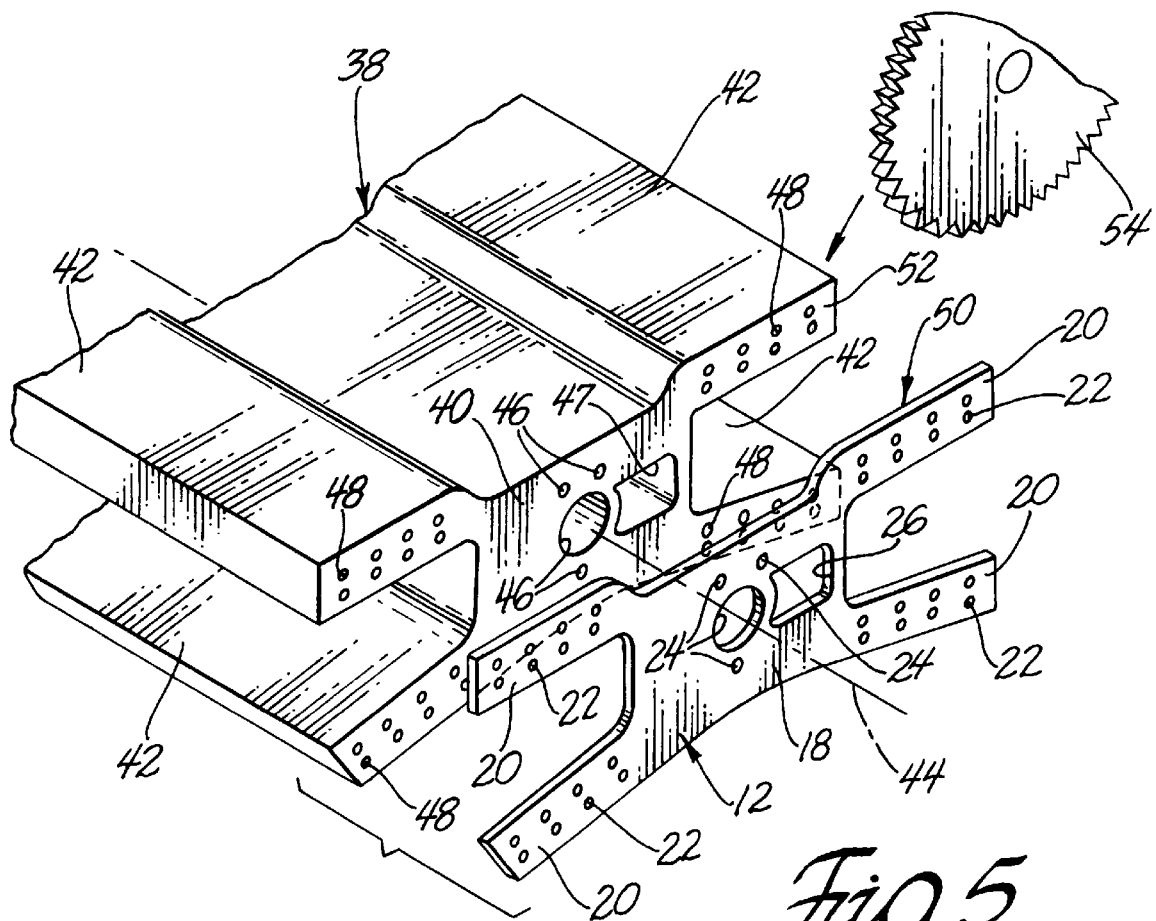
FIG. 5 is a schematic representation of another step in the method according to this invention of making the steering hand wheel.
Figure 6:
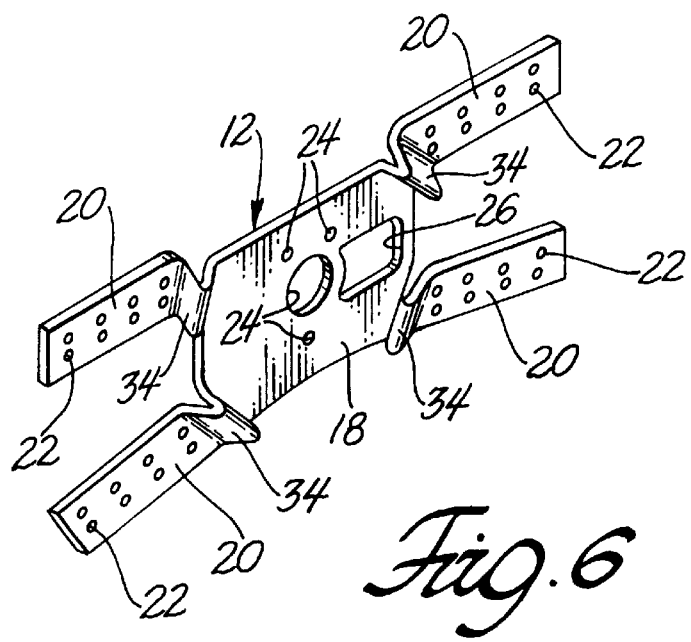
FIG. 6 is a perspective view of the spider of the steering hand wheel made by the method according to this invention.

Referring to FIGS. 1–4, a fragmentarily illustrated steering hand wheel 10 for a motor vehicle, not shown, includes a metal spider 12, a plurality of reinforced plastic spokes 14, and a reinforced plastic rim 16. The metal spider 12 includes a flat platform portion 18 and a plurality of integral spoke bases 20 radiating generally from the corners of the platform portion each having a plurality of perforations 22 therein. The flat platform portion 18 has a plurality of apertures 24 therein for rigid attachment of the spider to a steering shaft, not shown, on a steering column of the motor vehicle. A supplemental inflation restraint apparatus, not shown, and/or other accessories mounted on the platform portion 18 may require one or more additional apertures therein represented generally by a rectangular aperture 26.

Each of the spokes 14 has an outboard end 28, FIG. 1, at which the spoke merges integrally with the plastic rim 16. Each of the spokes 14 has an inboard end 30 around a corresponding one of the spoke bases 20. A plurality of plastic pins 32 integral with the spokes 14 are captured in respective ones of the perforations 22 in the spoke bases 20. The plastic pins 32 cooperate with the perforations 22 in defining mechanical interlocks which prevent dislodgment of the inboard ends 30 of the spokes from the spoke bases 20. Each of the spoke bases has a schematically represented lobe 34 between the platform portion 18 of the spider and the perforations 22. A urethane foam cover 36, FIG. 1, is molded over the plastic rim 16, the plastic spokes 14, and a portion of the spider 12.

Manual effort applied at the plastic rim 16 of the steering hand wheel 10 by an operator is transferred by the plastic spokes 14 to the spoke bases 20 on the spider 12 and then through the spider to the aforesaid steering shaft of the motor vehicle. An impact on the plastic rim of the steering hand wheel induces plastic deformation of the spider at the lobes 34 which plastic deformation absorbs energy by converting into work a fraction of the kinetic energy of the impact.

Describing now the method according to this invention of making the steering hand wheel 10, an initial step is extruding through a die, not shown, an elongated metal billet 38, FIG. 5, having a cross sectional shape matching substantially the profile of the spider 12 of the steering hand wheel. The metal from which the billet 38 is extruded is preferably aluminum although other metals and plastic may be used in appropriate circumstances. The extruded billet 38 has a center portion 40 and a plurality of flange portions 42 parallel to a longitudinal centerline 44 of the billet. The center portion 40 matches the profile of the platform portion 18 of the spider and includes a plurality of extruded passages 46,47 parallel to the longitudinal centerline 44 of the billet matching the size and location of the apertures 24,26, respectively, in the spider. The flange portions 42 of the billet match the profiles of the spoke bases 20 and include a plurality of extruded passages 48 parallel to the longitudinal centerline 44 of the billet matching the size and location of the perforations 22 in the spoke bases.

After the billet 38 is extruded, the spider 12 is formed in a second step in the method according to this invention by cutting off a flat section 50, FIG. 5, from an end 52 of the billet perpendicular to the longitudinal centerline 44. This step may be performed by a schematically represented cut-off tool 54 or any other conventional apparatus. Because of the aforesaid match between the cross sectional shape of the billet and the profile of the spider, the flat section 50 automatically assumes the shape of the spider including the platform portion 18, the spoke bases 20, and all of the apertures 22,24,26 in the platform portion and the spoke bases.

After the flat section 50 is cut off, a third step in the method according to this invention consists of plastically deforming each of the spoke bases 20 between the platform portion 18 and the perforations 22 to form respective ones of the lobes 34. The lobes 34 are illustrated as simple folds in the spoke bases but may have other shapes compatible with energy absorption by plastic deformation as described above. It is, of course, within the scope of this invention to omit this step of forming the lobes 34 where alternate energy absorbing apparatus is available.

A fourth step in the method according to this invention is insert molding the reinforced plastic rim 16 and the reinforced plastic spokes 14 around the spider 18. Insert molding refers to a conventional plastic molding process in which the spoke bases 20 are inserted into a mold cavity, not shown, shaped like the plastic rim 16 and the plastic spokes 14 and into which mold cavity a flowable plastic melt of a plastic material such as 50% glass reinforced nylon is injected.

The flowable melt fills the aforesaid mold cavity and circulates around each of the spoke bases 20 and into each of the perforations 22 in the spoke bases. When the flowable melt cures solid, FIGS. 2–4, the spoke bases 20 are each encapsulated in a formed-in-place socket 56 in the inboard end 30 of the corresponding one of the plastic spokes 14. A characteristic of the insert molding process is that the flowable melt cures solid in intimate contact with the spoke bases 20 to assure a lash-free fit between each of the spoke bases and corresponding ones of the formed-in-place sockets 56. In addition, the flowable melt cures solid in each of the perforations 22 to define the plurality of integral plastic pins 32 which prevent dislodgment of the plastic spokes from the spoke bases by mechanically interlocking the two together.

An advantage of the method according this invention of making a steering hand wheel is that the extrusion step by which the billet 38 is formed produces a spider 12 having material properties which are superior to comparable properties of functionally equivalent structural elements made by die casting or metal stamping. Additionally, forming the spider by cutting off an end of the extruded billet 38 and insert molding a plastic rim and plastic spokes around such spider may afford manufacturing cost advantages relative to prior manufacturing process having die casting and/or metal stamping steps.

The above described method according to this invention of making the steering hand wheel 10 may be modified by the addition of a step of molding the soft cover 36 over the plastic rim 16 and the plastic spokes 14. The soft plastic cover 36 may be made of urethane foam and functions to enhance the appearance of the steering hand wheel and the comfort of an operator gripping the plastic rim of the steering hand wheel.

Having thus described the invention, what is claimed is:

1. A method of making a steering hand wheel for a motor vehicle including a metal spider having a platform portion with a plurality of apertures therein and a plurality of spoke bases each having a plurality of perforations therein, a plastic rim, and a plurality of plastic spokes integral with said plastic rim and mechanically interlocked with each of said spoke bases comprising the steps of:

forming an extruded metal billet having a cross sectional shape perpendicular to a longitudinal centerline of said billet matching the profile of said spider of said steering hand wheel and having a plurality of extruded passages parallel to said longitudinal centerline matching the size and the location of said plurality of apertures in said platform portion of said spider and the size and location of said plurality of perforations in said spoke bases on said spider, forming said spider by cutting off a flat section of said extruded metal billet perpendicular to said longitudinal centerline thereof, and insert molding said plastic rim and said plastic spokes around said spider with each of said spoke bases being encapsulated in a formed-in-place socket in an inboard end of a corresponding one of said plastic spokes and being mechanically interlocked to said corresponding one of said plastic spokes by a plurality of integral plastic pins disposed in respective ones of said plurality of perforations in said spoke bases.

2. The method of making a steering hand wheel for a motor vehicle recited in claim 1 further comprising the step of:

forming an energy absorbing lobe on each of said spoke bases between said plurality of perforations therein and said platform portion of said spider.

3. The method of making a motor vehicle steering wheel recited in claim 2 further comprising the step of:

molding a cover of urethane foam over said plastic rim and over each of said plastic spokes and over at least a fraction of said spider.

* * * * *